May 29, 1951 L. T. LEE 2,554,747
LIQUID DISPENSER
Filed May 23, 1949 2 Sheets-Sheet 1
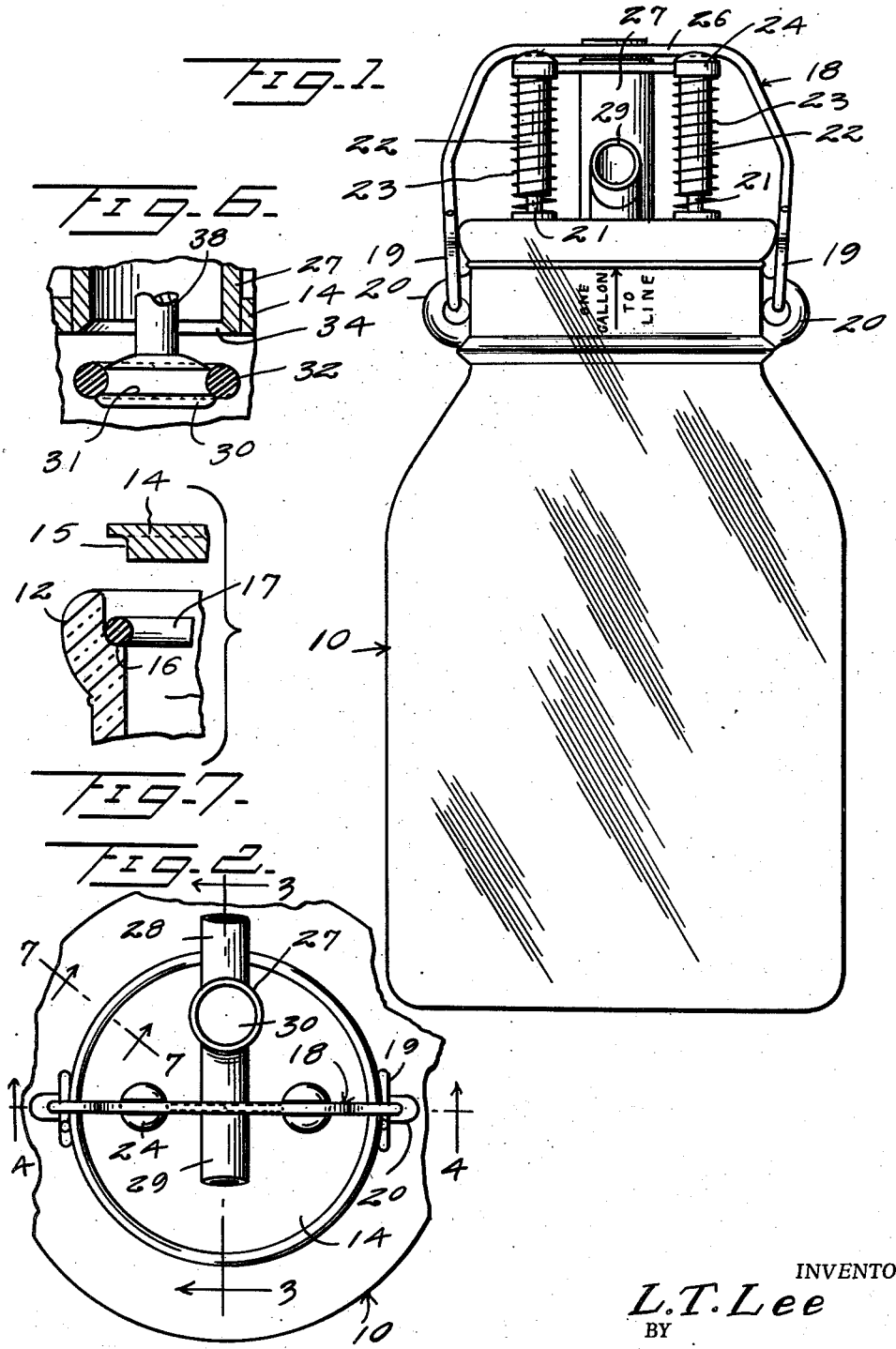
INVENTOR.
L. T. Lee
BY
Kimmel & Crowell ATTORNEYS May 29, 1951  L. T. LEE  2,554,747
LIQUID DISPENSER
Filed May 23, 1949  2 Sheets-Sheet 2
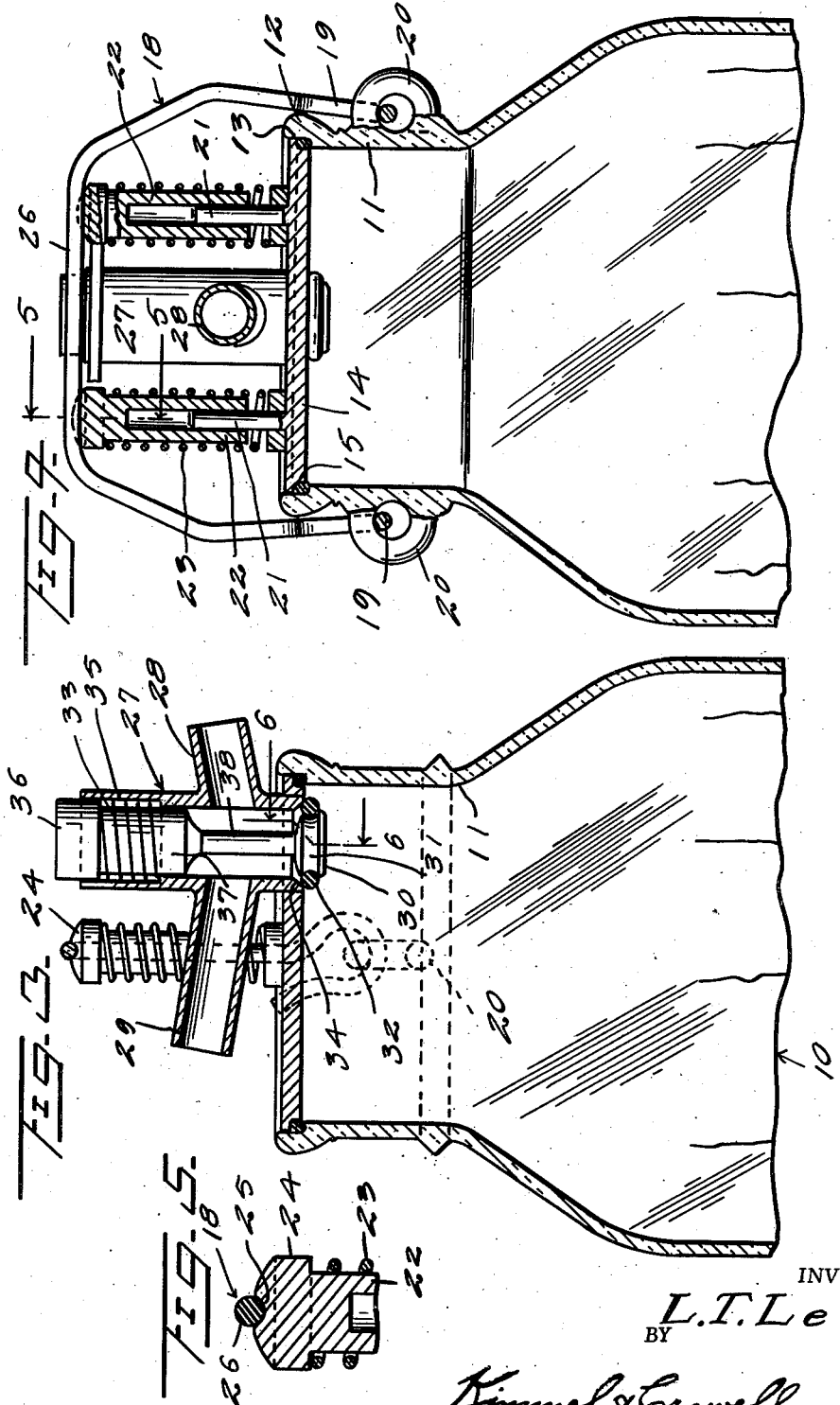
INVENTOR.
L. T. Lee
BY
Kimmel & Crowell ATTORNEYS Patented May 29, 1951

2,554,747

UNITED STATES PATENT OFFICE 2,554,747

LIQUID DISPENSER

Lloyd T. Lee, Holmen, Wis.

Application May 23, 1949, Serial No. 94,799

2 Claims. (Cl. 210—51.5)

This invention relates to milk and cream dispensing devices.

An object of this invention is to provide a valved means whereby milk and/or cream may be drawn off without mixing one with the other.

Another object of this invention is to provide a receptacle having a large mouth on which a closure cap is removably seated, the cap having secured thereto at a point offset from the center thereof, a draw-off valve formed with opposed discharge ports so that in one position of the receptacle the valve will be uppermost whereby opening of the valve will draw off the cream. In the reverse position of the closure cap, the valve will be lowermost so that upon opening of the valve milk will be drawn off from beneath the cream.

A further object of this invention is to provide an improved valve structure which can be easily and quickly taken apart for cleaning purposes.

With the above and other objects in view, my invention consists in the arrangement, combination and details of construction disclosed in the drawing and specification, and then more particularly pointed out in the appended claims.

In the drawings,

Figure 1 is a detail side elevation of a jar or receptacle having a dispensing means mounted thereon, constructed according to an embodiment of this invention, Figure 2 is a plan view, partly broken away, of the device, Figure 3 is a sectional view taken on the line 3—3 of Figure 2, Figure 4 is a sectional view taken on the line 4—4 of Figure 2, Figure 5 is a fragmentary sectional view taken on the line 5—5 of Figure 4, Figure 6 is a sectional view taken on the line 6—6 of Figure 3, showing the valve plug in open position, Figure 7 is a fragmentary sectional view in exploded form, showing the receptacle neck and closure plate with the seal for the closure plate.

Referring to the drawings, the numeral 10 designates generally a receptacle which is in the present instance designed for holding whole milk. The receptacle 10 is formed with a cylindrical neck 11 having a bead 12 at its upper end, and a rabbet 13 formed in the bead 12.

A disc-shaped closure plate 14 is adapted to engage in the rabbet 13, being formed with a rabbet at its marginal edge confronting the shoulder 16 formed on the inner end of the rabbet 13. A ring-shaped compressible sealing member 17 is adapted to engage on the seat 16 and is tightly compressed when the plate 14 is in closed position, as will be hereinafter described.

The plate 14 is removably mounted on the neck 11 by means of a U-shaped bail 18 which is formed on the lower ends thereof with eyes 19 engaging outstanding eyes 20 carried by the neck 11. The plate 14 has extending upwardly therefrom a pair of studs 21 disposed on opposite sides of the center of the plate, and a pair of sleeves 22 loosely engage the studs 21, being constantly urged away from plate 14 by means of springs 23. The sleeves 22 are formed at their upper ends with heads 24 having grooves 25 in their upper sides within which the bight 26 of the bail 18 is adapted to removably engage.

The closure plate 14 has secured thereto a valve housing 27 of cylindrical configuration which has extending therefrom an opposed pair of discharge nipples 28 and 29. The valve housing 27 is disposed at one side of the axial center of the plate 14, the purpose for which will be hereinafter described.

A valve plug 30 formed with an annular groove 31 within which a ring-shaped sealing member 32 is mounted is adapted to be normally urged to a closed position by means of a spring 33. The inner end of the valve housing 27 is formed with a tapered valve seat 34 against which the sealing member or gasket 32 is normally positioned, and as shown in Figures 3 and 6, the plug or head 30 is of a diameter such that this plug or head may be readily passed through the interior of the housing 27 when the sealing member 32 is removed from the groove 31.

The spring 33 is mounted in a counterbore 35 formed in the housing 27, bearing at its inner end against the inner end of the counterbore 35 and bearing at its outer end against a plug operating button 36. The button 36 has extending inwardly therefrom a slide member 37 which slidably engages the bore of the housing 27, and a reduced diameter valve stem 38 extends from the body or slide member 37.

In the use and operation of this device, the closure plate 14 is initially removed to permit placing whole milk within the receptacle 10. The closure 14 is secured in the neck 11 by raising the bail 18 to engage the heads 24 of the sleeves 22. At this time the closure plate 14 will be in liquid tight sealed position in the neck 11. The nipple 28 is relatively short, extending a slight distance beyond the neck 11, and constitutes the milk delivering nipple. When the receptacle 10 is tilted to the right, as viewed in Figure 3, the cream which rises to the top of the milk will be disposed to the left of the valve housing 27 so that the milk may be drawn from beneath the cream. In the event it is desired to withdraw the cream from on top of the milk, the receptacle 10 is tilted to the left, as viewed in Figure 3, so that the nipple 29 will be lowermost. The valve operating button 36 is then moved inwardly so that the cream can be removed from on top of the milk.

With a valve structure as hereinbefore described, the valve structure may be maintained in a sanitary condition and the valve plug, with the operating button 36, can be easily and quickly removed from the housing 27 by removing gasket 32 from the head or plug 30. The head 30 which is formed integral with the stem 38, the guide 37, and the button 36, may then be removed through the outer end of the housing 27.

I do not mean to confine myself to the exact details of construction herein disclosed, but claim all variations falling within the purview of the appended claims.

What I claim is—

1. A liquid dispensing means for selectively dispensing a plurality of liquids of different specific gravities from the same container, said container having a closure plate, comprising a tubular housing offset axially from the center of said plate, a pair of diametrically opposed spouts extending from said housing radially of said plate whereby upon tilting said container in one direction the liquid of higher specific gravity will be juxtaposed to said housing to flow through one of said spouts and upon tilting of said container in the opposite direction the liquid of higher specific gravity will be displaced between said closure plate and the tilted side wall of said container to admit the liquid of lower specific gravity, normally stratified beneath the liquid of higher specific gravity, to said housing for pouring through the other of said spouts, a pair of studs secured to said plate on opposite sides of said spout, sleeves removably mounted on said studs, heads on said sleeves having grooves therein, springs biasing said sleeves away from said plate, and a bail engaging in the grooves in said heads normally securing said plate to said container.

2. The construction of claim 1 wherein the housing contains a spring biased closure valve and manually operable means for opening said valve.

LLOYD T. LEE.

REFERENCES CITED

The following references are of record in the file of this patent:

UNITED STATES PATENTS

| Number | Name | Date |
|---|---|---|
| 167,530 | Haury | Sept. 7, 1875 |
| 178,745 | Dreker | June 13, 1876 |
| 1,030,306 | Hull | June 25, 1912 |
| 1,058,599 | Kiger | Apr. 8, 1913 |
| 1,274,867 | Ford | Aug. 6, 1918 |
| 1,279,667 | Davis | Sept. 24, 1918 |
| 1,361,290 | Spruill | Dec. 7, 1920 |
| 1,459,558 | Stark | June 19, 1923 |
| 1,982,071 | Roberts | Nov. 27, 1934 |
| 2,008,254 | Kusche | July 16, 1935 |
| 2,197,352 | Terkel | Apr. 16, 1940 |
| 2,327,574 | Zinkil et al. | Aug. 24, 1943 |
| 2,380,871 | Robinson | July 31, 1945 |

FOREIGN PATENTS

| Number | Country | Date |
|---|---|---|
| 540,843 | Great Britain | Oct. 31, 1941 |